G. C. ABBE.
EQUALIZING SYSTEM FOR CARS.
APPLICATION FILED DEC. 12, 1912.

1,060,397.

Patented Apr. 29, 1913.

2 SHEETS—SHEET 1.

Inventor-
George C. Abbe.
by his Attorneys

G. C. ABBE.
EQUALIZING SYSTEM FOR CARS.
APPLICATION FILED DEC. 12, 1912.

1,060,397.

Patented Apr. 29, 1913.
2 SHEETS—SHEET 2.

Witnesses.—
Walter Chism
Will A. Burrows

Inventor.—
George C. Abbe.
by his Attorneys.—
Howson & Howson

UNITED STATES PATENT OFFICE.

GEORGE C. ABBE, OF LANSDOWNE, PENNSYLVANIA, ASSIGNOR TO THE BALDWIN LOCOMOTIVE WORKS, OF PHILADELPHIA, PENNSYLVANIA, A CORPORATION OF PENNSYLVANIA.

EQUALIZING SYSTEM FOR CARS.

1,060,397.  Specification of Letters Patent.  Patented Apr. 29, 1913.

Application filed December 12, 1912. Serial No. 736,369.

*To all whom it may concern:*

Be it known that I, GEORGE C. ABBE, a citizen of the United States, residing in Lansdowne, county of Delaware, State of Pennsylvania, have invented certain Improvements in Equalizing Systems for Cars, of which the following is a specification.

My invention relates to certain improvements in locomotives, particularly of the electric type, where two or more trucks support the cab or frame extending over the said trucks.

The object of my present invention is to equalize the bearing of the body of the cab of a locomotive on two, three, or more trucks according to the type of the locomotive.

While I have illustrated the invention as relating particularly to electric locomotives, it will be understood that it can be adapted to cars or other vehicles where the trucks are independently connected to the vehicle body and it is desired to distribute the load evenly over all of the trucks.

Figure 1:
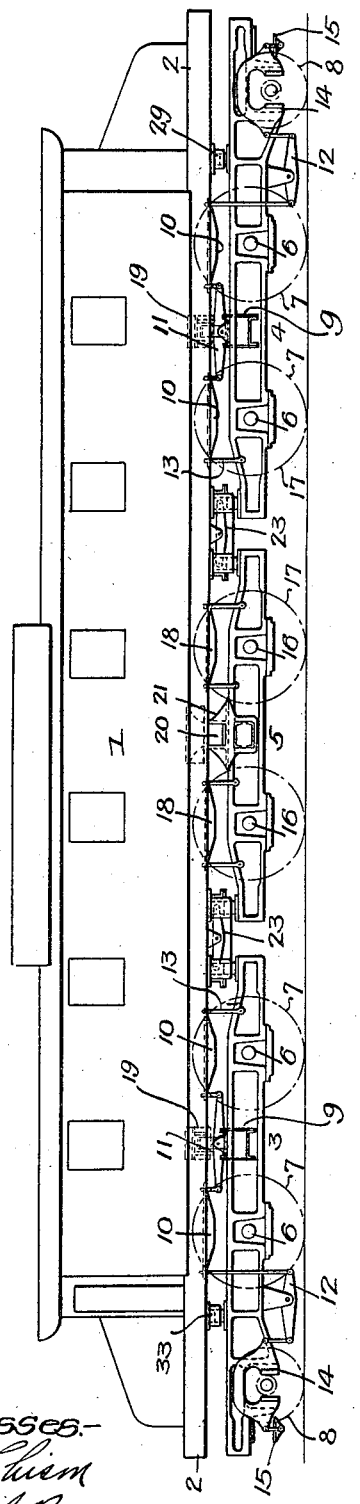
Figure 3:
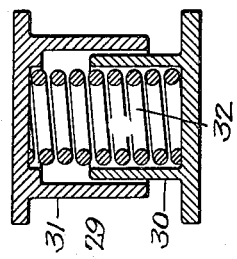
Figure 2:
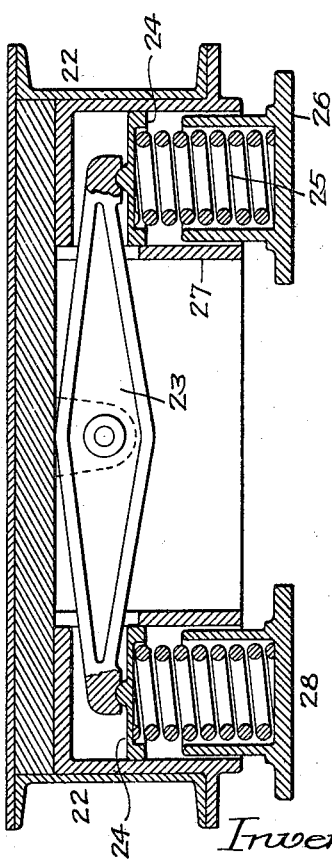
Figure 4:
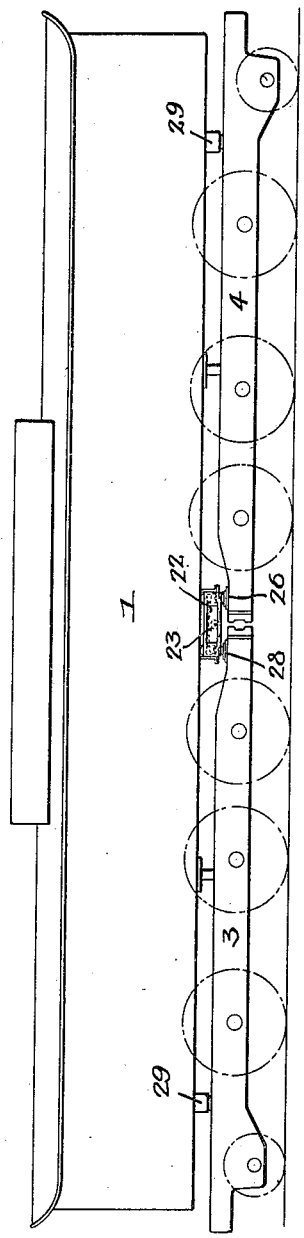
Figure 5:
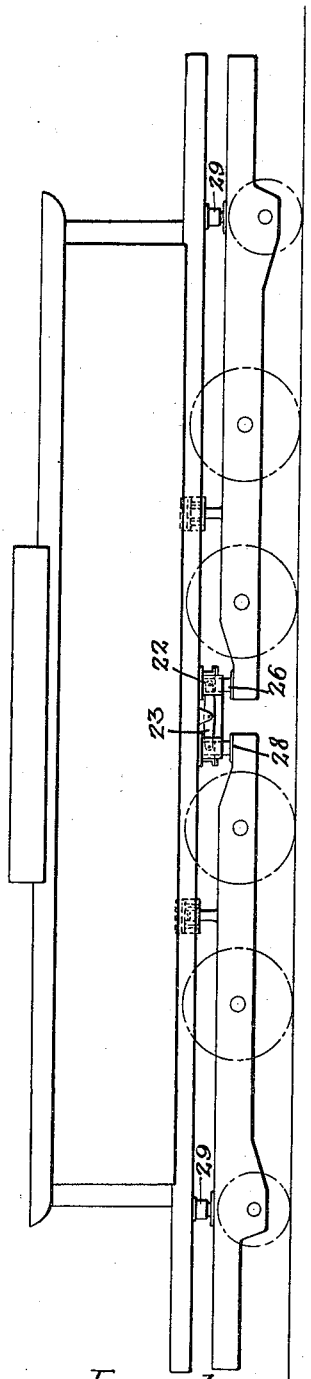

In the accompanying drawings:—Figure 1, is a side view in diagram illustrating an electric locomotive having three trucks embodying my invention; Fig. 2, is an enlarged sectional view illustrating one of the equalizers; Fig. 3, is a sectional view of one of the end spring supports; Fig. 4, is a side view in diagram illustrating my invention applied to a car having two six wheel trucks; and Fig. 5, is a view in diagram illustrating my invention applied to a car having two four wheel trucks.

Referring to Fig. 1 of the drawings, 1 is the cab of the locomotive mounted on the usual frame 2 of any suitable construction. 3, 4, and 5 are the three trucks which support the cab. The end trucks are identical in construction. The frames 9 of these trucks have boxes for the axles 6 on which the traction wheels are mounted and at the outer end of each truck are trailer wheels 8. The axles 6 are driven, in the present instance, by electric motors of any suitable type not shown in the accompanying drawings. The equalizing mechanism for each of the end trucks consists of springs 10 resting upon the boxes of the axles; levers 11 and 12 connected to the springs; and a link 13 connecting one of the springs with the frame; one arm of the lever being connected to a yoke 14, the opposite end of the yoke being supported by a spring 15. This is the common construction in this type of locomotive. In the particular type of locomotive shown, the center truck 5 has two axles 16, preferably driven by motors and on the axles are wheels 17. Each axle has a spring 18 of the ordinary type. The trucks 3 and 4 are pivotally mounted on the usual king bolts 19, while the truck 5 has a central projection 20 adapted to guides 21, which allows the said truck to move laterally, but will retain it against any longitudinal movement independent of the frame of the cab. This enables the several trucks to accommodate themselves to any curves over which the locomotive passes or to any irregularities in the track. When one truck passes over a switch or a slight depression or elevation in the track, the major portion of the weight is carried on that particular truck and it is the object of my present invention to equalize the weight by connecting the several trucks so that the weight will be distributed. This is accomplished in the following manner: A lever 23 is pivoted to a housing 22 secured to the frame of a superstructure such as the cab of a locomotive at a point between the trucks. One arm of this lever rests upon a spring plate 24 supported by a spring 25 carried by a slide plate 26 adapted to a guide 27 in the housing 22. The other arm of the lever 23 is adapted to a spring plate 24 supported by a spring 25 carried by a slide plate 28. The construction of the two spring devices is similar. The slide plate 26 rests upon the end of the truck 5 and the slide plate 28 rests upon the end of the truck 3. There is a similar equalizer having slide plates 26 and 28 which rest upon the opposite end of the truck 5 and the inner end of the truck 4, as clearly shown in Fig. 1. 29 is a spring box made in two sections 30 and 31, with a spring 32 between them and this spring box rests between the outer end of the truck 4 and the cab frame, while a similar spring box 33 is located between the outer end of the truck 3 and the cab frame. The upper member 31 of both of these spring boxes is secured to the cab frame, while the portions 30 are free to slide on the truck.

It will be seen by the above construction that any unevenness or any rocking motion or lifting motion imparted to any one of these three trucks will be evenly distributed, through the medium of the equalizing device, to all of the trucks; relieving the trucks and also the cab body from local strains and causing the locomotive to ride more easily and evenly than is possible when the trucks are not connected by the equalizing mechanism and the weight is unevenly distributed.

While I have shown in Fig. 1 the invention applied to a car or locomotive having three trucks, it will be understood that it may be used in connection with a car having two independently swiveled trucks, or a car having more than three, without departing from the essential features of the invention.

In Fig. 4, I have illustrated the invention applied to a locomotive having two trucks, each provided with wheels and two trailers, while in Fig. 5, I have shown a locomotive having two four wheel trucks.

I claim:

1. The combination of a body; two trucks pivoted to the body and supporting the same; with equalizing mechanism connecting the trucks and the body.

2. The combination of a body, three trucks coupled directly to the body; with equalizing mechanism connecting the several trucks and connected to the body at a point between the trucks.

3. The combination of a body, a plurality of trucks connected directly to the body and supporting the same; with equalizing levers pivotally mounted on the body portion between the trucks and connecting adjoining trucks.

4. The combination of a body; a plurality of trucks; equalizing levers mounted on the body between the trucks; slide plates connected to the levers; and spring boxes located between the outer ends of the end trucks and the body.

5. The combination of a body; a plurality of trucks located under the body; equalizing levers pivoted to the body and located between the trucks; slide plates bearing upon the trucks; a spring located between each slide plate and one arm of each lever; with spring boxes between the outer ends of the outer trucks and the body.

6. The combination in an electric locomotive, of a superstructure forming a body; three trucks mounted under the cab body; the central truck having a sliding connection with the cab body; the end trucks having a pivotal connection with the body; equalizing levers pivoted to the body at a point midway between the trucks; slide plates and springs mounted between each slide plate and one arm of each of the levers; said slide plates bearing upon the inner ends of the end trucks and the ends of the central truck; with spring boxes mounted on the cab frame and having a slide plate resting on the outer end of the outer trucks.

7. The combination of a car body; a housing secured to the under side of the body; an equalizing lever pivoted to the housing; guides in the housing; slide plates mounted in the guides; springs mounted on the guide plates; a spring plate mounted on each spring directly under the ends of the equalizing lever; with two trucks mounted under the car frame; one of said guide plates resting upon the end of one truck and the other guide plate resting on the end of the other truck.

In testimony whereof, I have signed my name to this specification, in the presence of two subscribing witnesses.

GEORGE C. ABBE.

Witnesses:
Wm. E. Shupe,
Wm. A. Barr.

Copies of this patent may be obtained for five cents each, by addressing the "Commissioner of Patents, Washington, D. C."